(12) United States Patent
Vuppaladhadiam

(10) Patent No.: US 11,295,720 B2
(45) Date of Patent: Apr. 5, 2022

(54) ELECTRONIC COLLABORATION AND COMMUNICATION METHOD AND SYSTEM TO FACILITATE COMMUNICATION WITH HEARING OR SPEECH IMPAIRED PARTICIPANTS

(71) Applicant: Mitel Networks, Inc., Mesa, AZ (US)

(72) Inventor: Harikrishna Vuppaladhadiam, Fremont, CA (US)

(73) Assignee: Mitel Networks, Inc.

( * ) Notice: Subject to any disclaimer, the term of this patent is extended or adjusted under 35 U.S.C. 154(b) by 206 days.

(21) Appl. No.: 16/424,257

(22) Filed: May 28, 2019

(65) Prior Publication Data
US 2020/0380951 A1    Dec. 3, 2020

(51) Int. Cl.
*G10L 13/00* (2006.01)
*G10L 15/26* (2006.01)

(52) U.S. Cl.
CPC ............. *G10L 13/00* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 6,683,937 B1 | 1/2004 | Watson et al. | |
| 6,853,716 B1 * | 2/2005 | Shaffer | H04M 3/56 370/260 |
| 6,865,264 B2 * | 3/2005 | Berstis | H04M 3/569 379/202.01 |
| 10,628,743 B1 * | 4/2020 | Kalukin | G06F 16/367 |
| 2005/0021344 A1 * | 1/2005 | Davis | H04M 3/56 704/277 |
| 2005/0232166 A1 | 10/2005 | Nierhaus | |
| 2006/0287860 A1 * | 12/2006 | Agapi | G10L 13/00 704/260 |
| 2007/0071206 A1 * | 3/2007 | Gainsboro | G10L 25/63 379/168 |
| 2008/0227438 A1 | 9/2008 | Fletcher | |
| 2013/0144619 A1 * | 6/2013 | Lord | H04M 3/56 704/235 |
| 2013/0294595 A1 | 11/2013 | Michaud et al. | |
| 2013/0325877 A1 * | 12/2013 | Niazi | G06Q 30/0203 707/748 |
| 2017/0206064 A1 * | 7/2017 | Breazeal | G06F 8/36 |
| 2017/0323643 A1 * | 11/2017 | Arslan | G10L 17/00 |
| 2018/0267774 A1 * | 9/2018 | Williams | G06F 3/167 |
| 2020/0084056 A1 * | 3/2020 | Deluca | H04L 12/1818 |
| 2020/0105261 A1 * | 4/2020 | Oleksandrovych | G10L 21/0216 |
| 2020/0279553 A1 * | 9/2020 | McDuff | G06K 9/00302 |
| 2020/0334740 A1 * | 10/2020 | Bedell | G06F 16/90332 |
| 2020/0342862 A1 * | 10/2020 | Gao | G10L 15/22 |
| 2021/0193110 A1 * | 6/2021 | Park | G06F 40/279 |

* cited by examiner

*Primary Examiner* — Neeraj Sharma

(57) ABSTRACT

An electronic communication method and system are disclosed. Exemplary methods can be used by hearing or speech-impaired participants in a conference, e.g., collaboration, environment to facilitate communication between conference participants.

20 Claims, 3 Drawing Sheets

ELECTRONIC COLLABORATION AND COMMUNICATION METHOD AND SYSTEM TO FACILITATE COMMUNICATION WITH HEARING OR SPEECH IMPAIRED PARTICIPANTS

FIELD OF INVENTION

The present disclosure generally relates to electronic communication methods and systems. More particularly, the disclosure relates to methods and systems suitable for collaborative electronic communications with hearing and/or speech impaired participants.

BACKGROUND

Electronic communication systems, such as audio conferencing systems and video conferencing systems, allow participants in different locations to communicate with one another. Such systems generally include a conferencing engine and one or more devices coupled (e.g., wired or wirelessly) to the conferencing engine.

When a remote participant has a speech impairment, or when it may be otherwise difficult for a remote participant to participate using speech, the participant may resort to conveying information using text, rather than audio information. Similarly, participants with hearing impairments or who may be in an environment in which it may be difficult to hear what other participants are saying may receive information in the form of text, rather than audio information.

While systems that send or receive text information in place of audio information may work for some applications, such systems do not generally allow hearing or speech impaired participants or participants in environments that make it difficult to participate via traditional audio information to participate in an electronic communication in an efficient manner. For example, such systems generally do not provide means to effectively respond to a communication or to interact with other participants in a manner that resembles a communication of a non-impaired participant. Furthermore, such systems do not provide impaired participants with an ability to offer communications in a manner that is human-like and that resembles the communications of non-impaired participants.

Accordingly, improved electrical communication methods and systems are desired. Any discussion of problems and solutions provided in this section has been included in this disclosure solely for the purposes of providing a context for the present invention and should not be taken as an admission that any or all of the discussion was known at the time the invention was made.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The present disclosure relates generally to electronic communication methods and systems. Exemplary electronic communication methods and systems can be used to, for example, facilitate electronic communication with one or more participants that may be hearing or speech impaired and/or that may be in an environment that may make it difficult to hear and/or to be understood. Exemplary methods and systems enable collaborative audio and/or video conference services that can connect a plurality of devices to another device, such as a conference hub or engine, for the purposes of, for example, allowing collaboration of participants in a meeting setting. The meeting may occur with one or more participants in a room and/or with one or more participants at various geographically dispersed locations.

Figure 1:
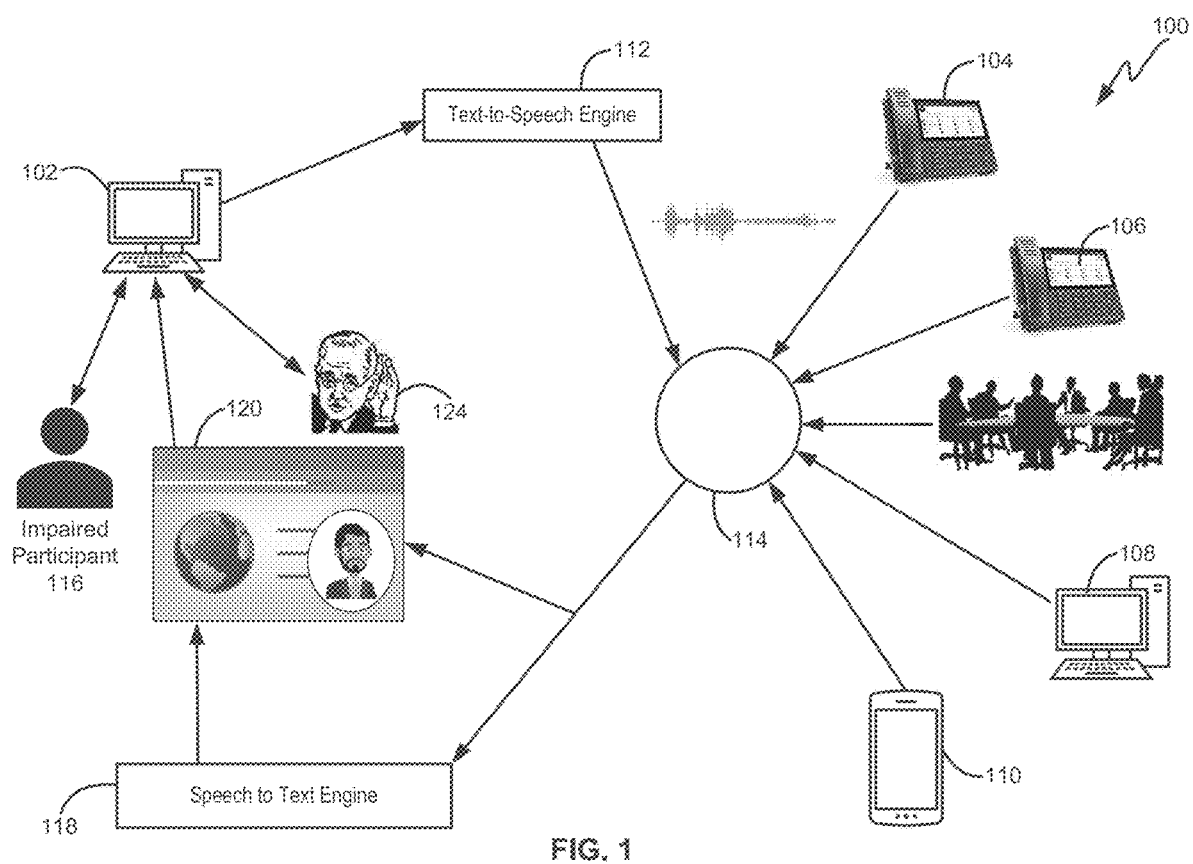
FIG. 1 illustrates an electronic communication system in accordance with various exemplary embodiments of the disclosure.

FIG. 1 illustrates an electronic communication system 100 in accordance with at least one embodiment of the disclosure. Electronic communication system 100 includes a first participant device 102, one or more second participant devices 104-110, a text-to-speech (TTS) engine 112, a conferencing engine 114, a speech-to-text (STT) engine 118 and a sentiment engine 120. As set forth in more detail below, during operation of communication system 100, a participant 116 with a speech impairment or that may otherwise have problems communicating using audio information (e.g., a participant in a noisy environment or in an environment where the participant cannot speak or speak at a desired volume) can enter text using device 102, the text is converted to audio information using TTS engine 112, and the audio information is mixed with other audio information from the conference (e.g., from one or more second participant devices 104-110) using conferencing engine 114, such that participant 116 can interact in the conference in a manner similar to other (e.g., non-impaired) participants. Additionally or alternatively, audio information can be received by STT engine 118 to convert audio information to text information, and the text information can be combined with information corresponding to sentiment information from sentiment engine 120. The combination of the text information and information corresponding to the sentiment information can be displayed on first participant device 102.

First participant device 102 and second participant devices 104-110 can be or include any suitable electronic device, such as a smart phone, a tablet computer, a personal computer, a work station, or any other device that includes a an application or client and a user interface to allow a participant to perform one or more tasks as described herein.

The terms user and participant as used herein can be used interchangeably. First participant device 102 and second participant devices 104-110 can include one or more input devices (such as a keypad or virtual keypad), and one or more speakers, and include one or more wireless communication devices, such as a mobile communication device, a WiFi device, a Bluetooth, or the like. As set forth in more detail below, first participant device 102 and second participant devices 104-110 can connect to conferencing engine 114 using wireless technology (e.g., using a mobile telephone network), other wireless technologies, and/or wired technology.

In accordance with one example, first participant device 102 includes an application or client that receives input from a user via the user interface and stores the input as text information. First participant device 102 causes the text information to be sent to TTS engine 112. The client can be, for example, a collaboration or other communication client. In accordance with another example, first participant device 102 includes an application or client that can additionally or alternatively receive information from STT engine 118 and display text information and information corresponding to sentiment information received from sentiment engine 120 on first participant device 102.

Text-to-speech engine 112 converts the text information into audible information. The audible information is then sent to a mixer within conferencing engine 114. Although separately illustrated, text-to-speech engine 112 can form part of first participant device 102 and/or conferencing engine 114.

Conferencing engine 114 can include one or more servers. Conferencing engine 114 can be used to authenticate participants in a meeting, initiate an electronic communication between first participant device 102 and one or more second participant devices 104-110, and provide other communication services. For example, conferencing engine 114 can provide collaborative communication between first participant device 102 and the one or more second participant devices 104-110. Additional features of exemplary conferencing engine 114 are described in more detail below in connections with FIGS. 2 and 3.

Figure 2:
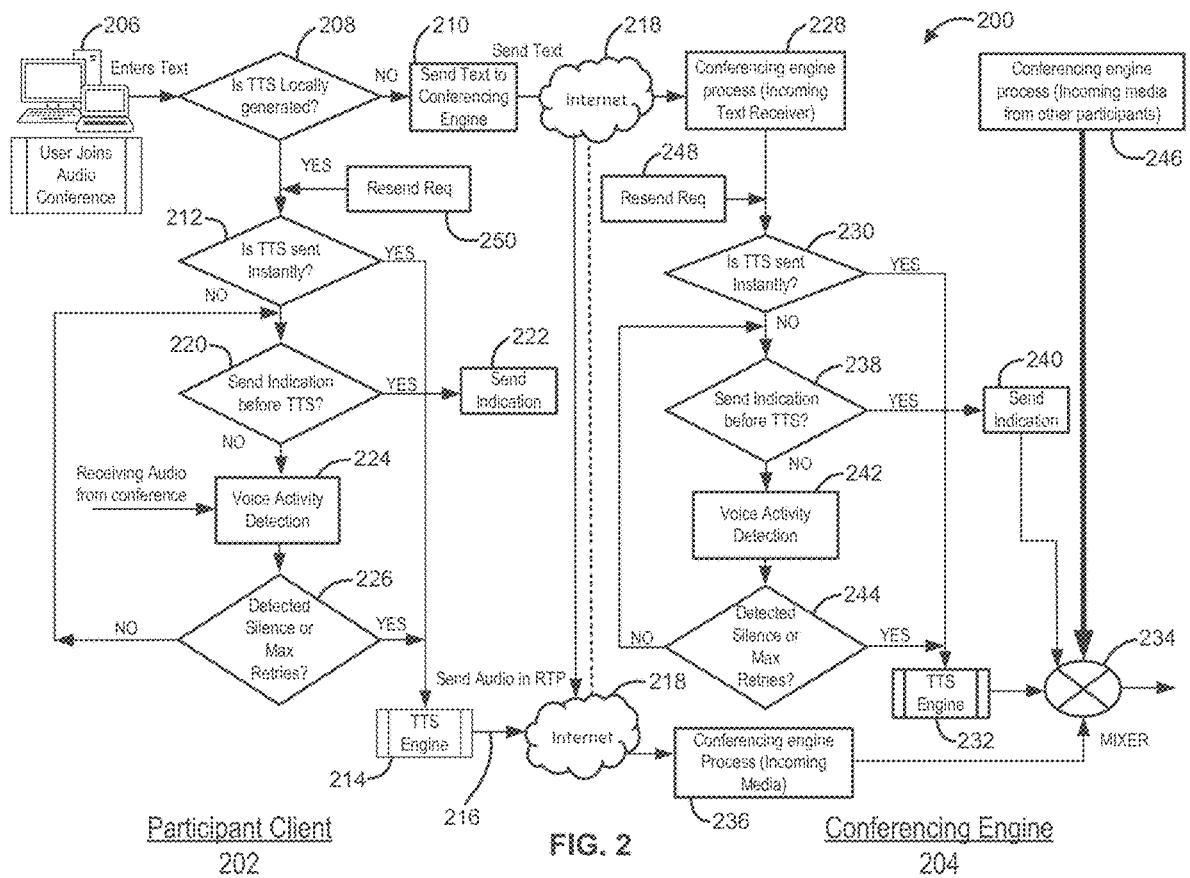
FIG. 2 illustrates a flow diagram and method in accordance with exemplary embodiments of the disclosure.
Figure 3:
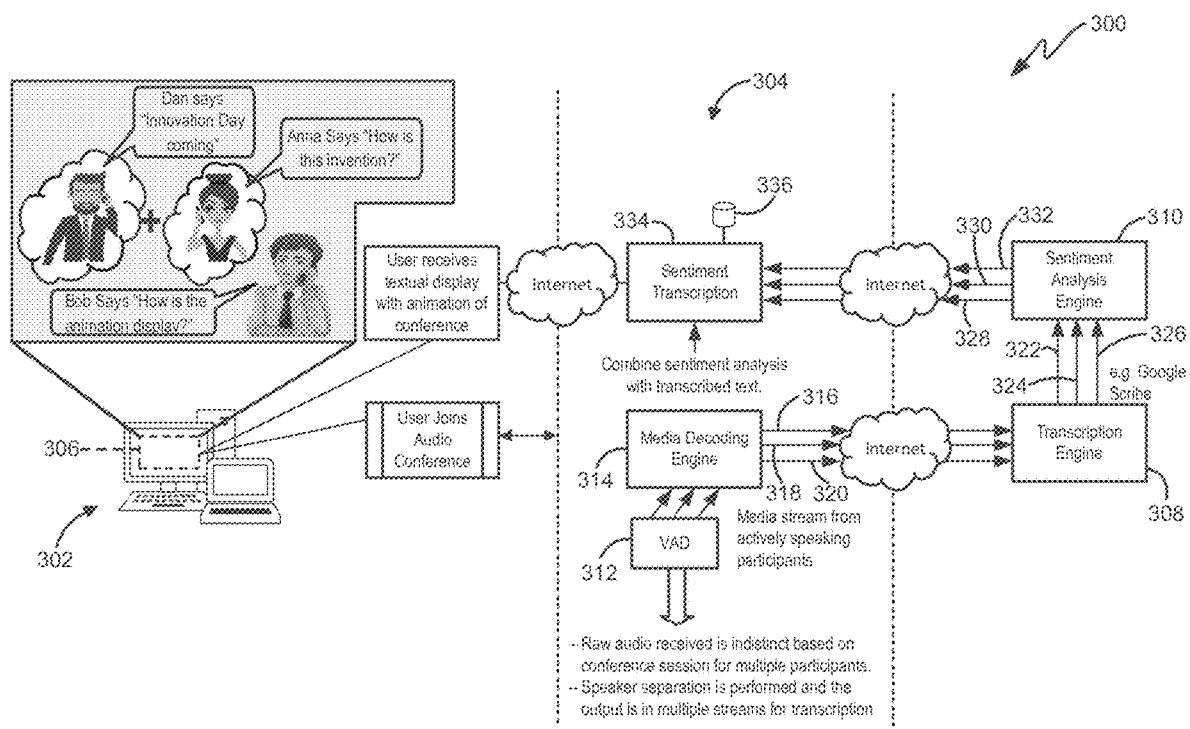
FIG. 3 illustrates a flow diagram and method in accordance with additional exemplary embodiments of the disclosure.

FIGS. 2 and 3 illustrate exemplary methods for conveying information suitable for speech impaired participants and hearing impaired participants, respectively. Although separately illustrated the methods can be combined. Similarly, either or both methods can be performed using the same system, such as system 100.

Exemplary electronic communication methods suitable for participants that may have a speech impairment include entering text information on a first participant device, determining whether to send text information to a text-to-speech engine immediately, sending the text information to a text-to-speech engine to convert the text information to audio information, providing the audio information received from the text-to-speech engine to a conferencing engine, and mixing the audio information received from the text-to-speech engine with audio information received from a second participant device. The method can also include a step of sending an indication to the first participant device to initiate sending text information to a text-to-speech engine and/or sending audio information to a conferencing engine. Additionally or alternatively, the method can further include a step of determining whether a predetermined period of audio silence is detected.

FIG. 2 illustrates a method 200 in accordance with embodiments of the disclosure. Method 200 is illustrated with a participant (e.g., a speech-impaired participant) client 202 (which can form a part of a first participant device, such as first participant device 102) and a conferencing engine 204 (which can be the same or similar to conferencing engine 114). As set forth in more detail below, method 200 allows a participant to enter text information with a text-entry field of the participant client and facilitates desired/optimal delivery timing of the corresponding audio information to conferencing engine 204.

Method 200 includes a first participant entering text (step 206)—e.g., using a first participant device, such as first participant device 102. At step 208, the first participant device determines whether the text entered during step 206 is converted to audio information using the first participant device or whether the text information is sent to a conferencing engine 204 (step 210). The determination can be made by, for example, determining whether the first participant device includes a text-to-speech engine—or not. Additionally or alternatively, the participant client can be configured to enable whether the text to speech conversion is performed locally or not. If the first participant device converts the text to audio information, method 200 proceeds to determining whether to send text-to-speech information instantly to a conferencing engine or whether to wait (step 212). Determination step 212 can be done by, for example, by configuring the participant client (e.g., by a participant or an administrator). Text information as described herein can be transmitted using, e.g., RFC 4103 (RFC 2793) method, using RTP Payload for text conversation or Instant Messaging Protocol or any other suitable protocol.

If, during step 212, it is determined to immediately send text-to-speech information to the conferencing engine 204, then the text information is sent to text-to-speech engine 214 on the first participant device. Audio information (e.g., RTP audio information) is then sent from the text-to-speech engine 214 to conferencing engine 204 (step 216)—e.g., via the Internet 218. Audio information from text-to-speech engine 214 can be processed by conferencing engine 204 (step 236), which mixes the audio information with media streams from other participants, after decoding the respective media streams.

Returning to step 212, if it is determined that the text information is not to be sent immediately to conferencing engine 204, method 200 proceeds from step 212 to a step of determining whether to send an indication (e.g., to the first participant) before sending the text information to a text-to-speech engine (step 220). A determination can be made by, for example, a user or administrator setting within the participant client.

If the determination at step 220 is yes, method 200 proceeds to step 222 of sending an indication, such as an audio signal (e.g., a beep) to a speaker on the first participant device, indicating that the participant can send the text information to be converted to audio information. Step 222 can include sending a unique mix of tones as short beep into the conference audio or playing an audio phrase indicating request for silence on the conference to allow the impaired participant to then cause text information to be sent to TTS engine 214. In some cases, an audible tone can only be heard by the first participant and is sent to them to provide a cue that a speech-segment resulting from the text-entry can be introduced. Additionally or alternatively, a signal can be sent to all participants to indicate that they should be silent, so that information from the first participant can be heard.

If the determination at step 220 is no (or not yes), method 200 proceeds to step 224 of detecting voice activity. Voice Activity Detection (VAD) can be detected using, for example, the ITU-T G.711 Appendix-II VAD/CNG algorithm to process speech data to detect voice activity or silence.

Method 200 then determines whether a predetermined period (e.g., about 0.5 to about 3 or about 2 seconds) of silence is detected during step 226. If the predetermined value is reached, then method 200 proceeds to converting the text information to audio information using TTS engine 214. Similarly, if a predetermined number (e.g., about 2 to about 10 or 3 or 4) of attempts or inquiries at step 226 have been tried, method 200 proceeds to sending text to TTS engine 214. If the predetermined thresholds for periods of silence and/or retries has not been met, method 200 can loop back to step 220. If silence is not detected beyond a predetermined time, the text information can be "barged in" and converted using TTS engine 214 and sent to conferencing engine 204 without waiting further in keeping with normal conversational dynamics. For example, if everyone else is talking over one another, a "no rules" approach to interacting can be employed.

TTS engine 214 and/or TTS engine 232, discussed below, can include speech cloning synthesis to match a participant's voice if recorded audio of the participant's voice exists. Alternatively, TTS engine 214 and/or TTS engine 232 can provide a customer a selectable voice or a designed voice. A designed voice can be synthesized by, for example, using Open Source eSpeak software speech synthesizer or CMU Flite Speech Synthesizer or Google Cloud solution like WaveNet Speech synthesis.

If conferencing engine 204 performs the text-to-speech conversion, then method 200 proceeds from step 210 of sending text information to conferencing engine 204 and conferencing engine 204 processing the incoming text information (step 228). For example, all the participants can dial in into the conferencing engine to participate a conference. Once the participants join, the conferencing engine receives all the incoming media streams from all the participants and mixes the incoming audio after decoding media streams. The conferencing engine section 228 describes the media stream in text form and conferencing engine section 246 receives the participants media stream in audio. As indicated in earlier section, the textual data of the participant media can be in RTP form using RFC 4103 standard or using Instant Messaging protocol, or web conferencing text already available in the conferencing engine.

At step 230, method 200 determines whether the text information should be immediately sent to text-to-speech engine 232 that is part of conferencing engine 204—or not. If yes, then the text information is sent to text-to-speech engine 232 for conversion to audio information, and the audio information is sent to mixer 234 for mixing with audio information from other participant devices. Similar to above, this determination can be based on a user or administrator setting—this time in the conferencing engine application.

If at step 230, a determination is no (or not yes), then method 200 proceeds to step 238 of determining whether (e.g., using a user setting in the conferencing engine software) to send an indication to the first participant (e.g., client 202) of when to cause text information to be sent to TTS engine 232 and/or an audio indication to mixer 234. Once the indication has been sent, audio information from text-to-speech engine 232 can be sent to mixer 234 for joining audio information from participant client 202 with audio information from other participant devices.

If the determination at step 238 is no (or not yes), method 200 proceeds to step 242 of detecting voice activity—e.g., using techniques described above in connection with step 224.

Method 200 then determines whether a predetermined period (e.g., 0.5-3 or 2 seconds) of silence is detected and/or a maximum number of retries (e.g., about 2-10 or 3 or 4) is attempted during step 244. If the predetermined value is reached, then method 200 proceeds to converting the text information to audio information using TTS engine 232. Similarly, if a predetermined number of attempts or inquiries at step 226 have been tried, method 200 proceeds to converting text to speech using TTS engine 232. If the predetermined thresholds for periods of silence and/or retries has not been met, method 200 can loop back to step 238. If silence is not detected beyond a predetermined time, the text information can be barged in and converted using TTS engine 232 and sent to mixer 234, without waiting.

Turning now to FIG. 3, a method 300 for facilitating communication with a person who may have a hearing impairment or who may otherwise not be able to hear a communication is illustrated. As noted above, although separately illustrated, methods 200 and 300 can be combined, such that a method can perform text-to-speech conversion for speech-impaired participants and textual display for hearing-impaired participants.

Method 300 can be used to facilitate interaction with hearing-impaired participants who interact with their world in ways that are not necessarily conformist (i.e., approaches used by those without disabilities). Some participants, such as clinically-deaf participants, can look beyond just words to communicate. As set forth in more detail below, method 300 can use pictograms and/or animation, which can be based on or mixed with sentiment analysis, to be displayed along side text to convey a "story" or narrative intended to summarize what is being communicated during a conference session. Similarly, participants without disabilities can receive a running view of the image or animated content (e.g., teamwork=picture of a flock of sheep; or pack of wolves if stated with conviction) designed to interpret the words being spoken during the same conference session.

Method 300 is illustrated in connection with a participant device 302 (which can be the same or similar to a first participant device as described herein), including a participant client 306, a conferencing engine 304 (which can be the same or similar to conferencing engine 114 and/or 204), a transcription engine 308, and a sentiment analysis engine 310. Transcription engine 308 and/or sentiment analysis engine 310 can form part of sentiment engine 120, described above in connection with FIG. 1.

Client 306 can perform various functions as described herein. As discussed in more detail below, client 306 allows a participant to participate in an audio conference and to receive visual information, such as text, pictorial information (e.g., pictures), and/or animated information to convey sentiment of one or more other participants.

Client 306 can be used to join an audio conference by sending/receiving credentials and/or meeting information to/from conferencing engine 304. Once a participant joins a conference using participant device 302, client 306 can be used to display visual content, such as images and/or animation as described herein.

Conferencing engine 304 includes a voice activity detection (VAD) engine 312 and a media decoding engine 314. Media, such as raw audio information (e.g., from first participant device 302 and another participant device) is received at VAD engine 312, which detects the audio information from multiple participant devices. Typically, this audio information is not identified with a particular participant or device. However, in accordance with embodiments of the disclosure, media decoding engine 314, which can be integrated with or coupled to VAD engine 312, separates the raw audio information into media streams 316-320 based on a connected participant device, such that each connected device has a corresponding media stream 316-320. In other words, audio information for each connected participant device is separated into a media stream 316-320. Each (e.g., separately identifiable) media stream 316-320 is transmitted to transcription engine 308. Although separately illustrated, transcription engine 308 can form part of device 302 or conferencing engine 304.

Transcribed information streams 322-326, which can be identified by or associated with particular participant devices, can be sent to sentiment analysis engine 310. Again, although separately illustrated, sentiment engine 310 can form part of device 302 or conferencing engine 304. Sentiment engine 310 receives transcribed media streams 322-326 and determines a sentiment associated with transcribed information in one or more media streams 322-326. Sentiment can be determined using, for example, using either Google Cloud Natural Language API or Stanford NLP sentiment analysis tools. Media streams 322-326 with transcribed information and sentiment information 328-332 are transmitted to a sentiment transcription engine 334, which generates information corresponding to the sentiment information—e.g., images and/or animation associated with a sentiment determined using sentiment analysis engine 310. The image and/or animation can be generated by obtaining images and/or animated content that is associated with a particular sentiment from a database 336. For example, database 336 can include images or animation of hands clapping when applause is detected in one or more of streams 328-332.

By way of examples, animation can be used to display semantic aspects of a conversation that are derived from the linguistic patterns based on, for example, standard NLP functions (see, e.g., Stanford NLP, which is open source). This provides an alternate way for people with disabilities to interact with their work environment—it provides users additional tools to interpret conversations, rather than using just plain text.

Transcribed information including sentiment information is then transmitted from conferencing engine 304 to participant device 302. Participant device 302 uses client 306 to cause transcribed information and sentiment information to be displayed on device 302. Alternatively, transcribed information from transcription engine 308 can be sent directly to both sentiment analysis engine 310 and sentiment transcription engine 334 and sentiment transcription engine 334 can combine the transcribed information and the sentiment information into one or more streams (one stream for each "other" participant), such that transcribed information and sentiment information can be associated with a particular participant.

Systems and methods described herein can help persons with speech and hearing disability to participate in audio conferences without any impediments and to converse seamlessly without other participants realizing any difficulty. The present invention has been described above with reference to a number of exemplary embodiments and examples. It should be appreciated that the particular embodiments shown and described herein are illustrative of the invention and its best mode and are not intended to limit in any way the scope of the invention as set forth in the claims. For example, although described in connection with speech or hearing impaired participants, methods and systems described herein can be used in other situations and/or by non-impaired participants, such as whenever a user is in a crowd and he/she wishes not to talk, but rather text; whenever a user can listen but not talk; and/or whenever a user can neither listen nor talk, but can view the text and send text.

It will be recognized that changes and modifications may be made to the exemplary embodiments without departing from the scope of the present invention. For example, although steps of methods are listed in a particular order, the steps need not be performed in the illustrated order and some steps may be performed simultaneously. These and other changes or modifications are intended to be included within the scope of the present invention, as expressed in the following claims.

What is claimed is:

1. An electronic communication system comprising:
   a first participant device comprising an application that receives input from a user and stores the input as text information;
   a second participant device;
   a text-to-speech engine that converts the text information into audio information; and
   a conferencing engine comprising a mixer that receives audio information from the text-to-speech engine and the second participant device and combines the audio information from the second participant device and the text-to-speech engine into an audio conference,
   wherein the conferencing engine sends an indication to the first participant device to initiate sending text information; and
   wherein the first participant device receives the indication, and upon receiving the indication, sends the text information to the text-to-speech engine to convert the text information to audio information, and
   wherein prior to sending the text information, the first participant device sends an indication to the second participant device that a user has information to share with the conferencing engine.

2. The electronic communication system of claim 1, wherein the first device comprises the text-to-speech engine.

3. The electronic communication system of claim 1, wherein a conferencing device comprises the text-to-speech engine.

4. The electronic communication system of claim 1, wherein the application comprises a client.

5. The electronic communication system of claim 1, wherein the first participant device determines whether to convert the text information to audio information using the first participant device.

6. The electronic communication system of claim 1, wherein the application determines whether the first device comprises a text-to-speech engine.

7. The electronic communication system of claim 1, wherein the indication comprises sending an audio signal to the first participant device.

8. The electronic communication system of claim 1, wherein the conferencing engine determines whether a predetermined period of audio silence is detected, and if the predetermined period of audio silence is detected, causes the text information to be sent to the text-to-speech engine.

9. An electronic communication system comprising:
   a first participant device comprising an application that causes information to be displayed on the first participant device to a first participant;

a conferencing engine that separates audio information from one or more second participant devices into one or more media streams, each media stream corresponding to the one or more second participant devices;

a speech-to-text engine that receives the one or more media streams and converts audio information from each of the one or more media streams into text information corresponding to each of the one or more second participant devices;

a sentiment analysis engine that receives the text information from the speech-to-text engine, wherein the text information received by the sentiment engine is associated with particular participant devices, a sentiment transcription engine that receive the media streams and sentiment information from the sentiment analysis engine and generates information corresponding to the sentiment information; and a database comprising one or more of images and animation;

wherein the information to be displayed comprises the text information and corresponding sentiment information.

10. The electronic communication system of claim 9, wherein the sentiment analysis engine and the sentiment transcription engine combine the text information and the sentiment information.

11. The electronic communication system of claim 10, wherein the first participant device receives sentiment information from the sentiment transcription engine.

12. The electronic communication system of claim 11, wherein the conferencing engine comprises a media decoding engine.

13. The electronic communication system of claim 12, wherein the information corresponding to the sentiment information comprises animated information.

14. The electronic communication system of claim 12, wherein the information corresponding to the sentiment information comprises pictorial information.

15. An electronic communication method comprising the steps of:

entering text information on a first participant device;

using the first participant device, determining whether to convert the text information to audio information using the first participant device;

sending an indication to the first participant device to initiate sending text information;

based on the step of sending an indication to the first participant, sending the text information to a text-to-speech engine to convert the text information to audio information;

providing the audio information received from the text-to-speech engine to a conferencing engine;

mixing the audio information received from the text-to-speech engine with audio information received from a second participant device, and sending an indicia for a request for silence on a conference and, after the request for silence, the first participant device causing the text information to be sent to the text-to-speech engine.

16. The electronic communication method of claim 15, further comprising a step of sending an indication that the first participant device has text information to send to the conferencing engine.

17. The electronic communication method of claim 15, wherein the step of determining whether to convert the text information to audio information using the first participant device comprises determining whether the first participant device comprises a text-to-speech engine.

18. The electronic communication method of claim 15, further comprising a step of speech cloning synthesis.

19. The electronic communication method of claim 15, further comprising a step of sending transcribed information to a sentiment analysis engine.

20. The electronic communication method of claim 19, further comprising a step of transmitting transcribed information including sentiment information to a conferencing server.

* * * * *